US009438951B2

(12) United States Patent
MacInnis

(10) Patent No.: US 9,438,951 B2
(45) Date of Patent: *Sep. 6, 2016

(54) ANTICIPATORY VIDEO SIGNAL RECEPTION AND PROCESSING

(71) Applicant: Broadcom Corporation, Irvine, CA (US)

(72) Inventor: Alexander G. MacInnis, Los Altos, MI (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/492,928

(22) Filed: Sep. 22, 2014

(65) Prior Publication Data

US 2015/0074708 A1    Mar. 12, 2015

Related U.S. Application Data

(63) Continuation of application No. 11/046,378, filed on Jan. 28, 2005, now Pat. No. 8,842,175.

(60) Provisional application No. 60/556,667, filed on Mar. 26, 2004.

(51) Int. Cl.
*H04N 7/20* (2006.01)
*H04N 21/438* (2011.01)
(Continued)

(52) U.S. Cl.
CPC ........ *H04N 21/4384* (2013.01); *H04N 5/4401* (2013.01); *H04N 5/50* (2013.01); *H04N 7/163* (2013.01); *H04N 21/4263* (2013.01); *H04N 21/4312* (2013.01); *H04N 21/4314* (2013.01); *H04N 21/4382* (2013.01);

(Continued)

(58) Field of Classification Search
CPC ................... H04N 21/4263; H04N 21/4384; H04N 21/4404
See application file for complete search history.

(56) References Cited

U.S. PATENT DOCUMENTS 5,758,257 A    5/1998    Herz et al.
5,933,192 A    8/1999    Crosby et al.
(Continued)

OTHER PUBLICATIONS

Non-Final Office Action for U.S. Appl. No. 11/046,378 mailed Jul. 2, 2008.

(Continued)

*Primary Examiner* — Gigi L Dubasky
(74) *Attorney, Agent, or Firm* — Foley & Lardner LLP; Joseph N. Ziebert; Helen H. Zhang

(57) ABSTRACT

A system and method that provide reduced latency in a video signal processing system. Various aspects of the present invention may comprise receiving a current request from a user for first video information. Such a request may, for example, be received with a user interface module. A first video stream and a second video stream may be received simultaneously, where the first video stream comprises the first video information currently requested by the user, and the second video stream comprises second video information not currently requested by the user. A video receiver module may, for example, perform such receiving. The first video stream may be processed to present the first video information to the user at the current time. Further, the second video stream may be pre-processed in preparation for being presented to the user in the future. A video processing module may, for example, perform such video stream processing.

16 Claims, 3 Drawing Sheets

(51) Int. Cl.

| | |
|---|---|
| *H04N 5/44* | (2011.01) |
| *H04N 5/50* | (2006.01) |
| *H04N 7/16* | (2011.01) |
| *H04N 21/426* | (2011.01) |
| *H04N 21/431* | (2011.01) |
| *H04N 21/44* | (2011.01) |
| *H04N 21/442* | (2011.01) |
| *H04N 21/45* | (2011.01) |
| *H04N 21/4623* | (2011.01) |
| *H04N 21/466* | (2011.01) |
| *H04N 21/472* | (2011.01) |

(52) U.S. Cl.
CPC . *H04N 21/44004* (2013.01); *H04N 21/44222* (2013.01); *H04N 21/4532* (2013.01); *H04N 21/4623* (2013.01); *H04N 21/4667* (2013.01); *H04N 21/472* (2013.01)

(56) References Cited

U.S. PATENT DOCUMENTS

| | | | |
|---|---|---|---|
| 6,029,045 A | 2/2000 | Picco et al. | |
| 6,519,011 B1 | 2/2003 | Shendar | |
| 6,591,013 B1* | 7/2003 | Taunton | 382/233 |
| 6,698,020 B1 | 2/2004 | Zigmond et al. | |
| 6,732,371 B1 | 5/2004 | Lee et al. | |
| 6,772,434 B1* | 8/2004 | Godwin | H04N 5/44543 348/E5.097 |
| 6,927,806 B2* | 8/2005 | Chan | 348/731 |
| 7,146,627 B1 | 12/2006 | Ismail et al. | |
| 8,842,175 B2* | 9/2014 | Macinnis | 348/68 |
| 2001/0048482 A1 | 12/2001 | Takemoto | |
| 2003/0012384 A1* | 1/2003 | Vicard et al. | 380/277 |
| 2003/0174844 A1 | 9/2003 | Candelore | |
| 2004/0111741 A1 | 6/2004 | DePietro | |
| 2005/0078757 A1 | 4/2005 | Nohrden | |
| 2005/0201559 A1 | 9/2005 | Van Der Heijden | |
| 2005/0207449 A1* | 9/2005 | Zhang | H04L 29/06027 370/486 |
| 2005/0273830 A1* | 12/2005 | Silver et al. | 725/105 |
| 2009/0153747 A1 | 6/2009 | Grimes | |

OTHER PUBLICATIONS

Final Office Action for U.S. Appl. No. 11/046,378 mailed Apr. 1, 2009.
Non-Final Office Action for U.S. Appl. No. 11/046,378 mailed Nov. 6, 2009.
Final Office Action for U.S. Appl. No. 11/046,378 mailed Jun. 21, 2010.
Non-Final Office Action for U.S. Appl. No. 11/046,378 mailed Mar. 10, 2011.
Final Office Action for U.S. Appl. No. 11/046,378 mailed Dec. 5, 2011.
Non-Final Office Action for U.S. Appl. No. 11/046,378 mailed Dec. 5, 2012.
Final Office Action for U.S. Appl. No. 11/046,378 mailed Jun. 20, 2013.
Non-Final Office Action for U.S. Appl. No. 11/046,378 mailed Dec. 18, 2013.
Notice of Allowance for U.S. Appl. No. 11/046,378 mailed May 19, 2014.

\* cited by examiner

ANTICIPATORY VIDEO SIGNAL RECEPTION AND PROCESSING

CROSS-REFERENCE TO RELATED APPLICATIONS/INCORPORATION BY REFERENCE

This patent application is a continuation of and claims priority to and the benefit of U.S. patent application Ser. No. 11/046,378, filed Jan. 28, 2005, which claims the benefit of U.S. Provisional Application No. 60/556,667, filed Mar. 26, 2004, the contents of which are hereby incorporated herein by reference in their entirety for all purposes.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

In various digital video systems, there is a latency time between when a user makes a request for particular video information and when the system presents the requested video information to the user. For example and without limitation, a user may specify a viewing channel corresponding to video information that the user is interested in viewing. Further for example, a user may select a video information title from a menu, a user may enter a channel up/down request, or a user may sequence through a list of favorite video channels.

There will generally be a latency time between when the user requests video information and when the system presents the requested video information to the user. There may be any of a large variety of causes for such latency. Such causes may comprise, without limitation, request processing delays, information communication delays and information processing delays. In general, users prefer that the latency time between a video information request and presentation of the requested video information to the user be minimized.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for reduced latency in a video signal processing system. Such a video signal processing system may, for example and without limitation, comprise a television, television receiver, personal video recorder, etc.

Various aspects of the present invention may comprise receiving a current request from a user for first video information. Such a request may, for example, be received with a user interface module. In an exemplary television scenario, such a request may comprise a request for a particular channel, next channel, previous channel, menu selection, etc.

A first video stream and a second video stream may be received simultaneously, where the first video stream comprises the first video information currently requested by the user, and the second video stream comprises second video information not currently requested by the user. A video receiver module may, for example, perform such receiving.

Various aspects of the present invention may comprise determining the second video stream based on any of a number of criteria. For example, such a determination may be based on a previously presented video program, a sequential list of programs, previous or next channel information, or monitored user request behavior.

The first video stream may be processed to present the first video information to the user at the current time. Further, the second video stream may be pre-processed in preparation for being presented to the user in the future. A video processing module may, for example, perform such video stream processing. For example and without limitation, such pre-processing may comprise buffering data corresponding to the second video stream, communicating conditional access information, tracking temporal aspects, performing various parsing activities, full or partial decoding, and/or managing a buffer to provide access point information with minimal latency.

These and other advantages, aspects and novel features of the present invention, as well as details of illustrative aspects thereof, will be more fully understood from the following description and drawings.

DETAILED DESCRIPTION OF THE INVENTION

Figure 1:
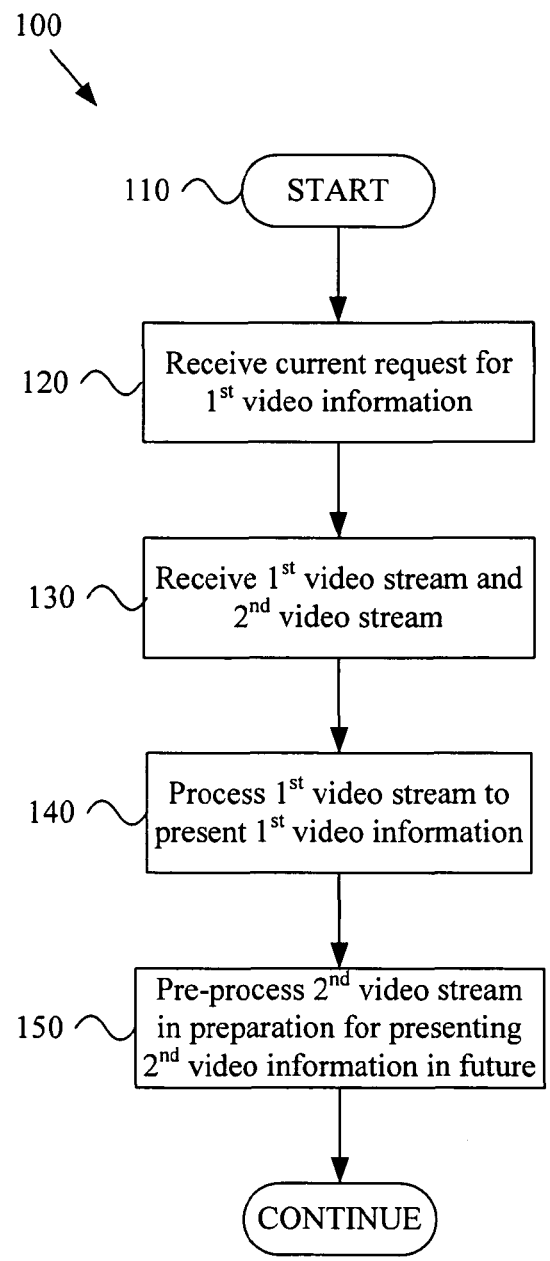
FIG. 1 is a flow diagram illustrating an exemplary method for providing reduced latency in a video signal processing system, in accordance with various aspects of the present invention.

FIG. 1 is a flow diagram illustrating a method 100 for providing reduced latency in a video signal processing system, in accordance with various aspects of the present invention. The exemplary method 100 may begin at step 110 in response to any of a large variety of causes and conditions. For example and without limitation, in an exemplary video signal-processing scenario, the method 100 may begin when a television receiver is powered up or turned on. Alternatively, for example, the method 100 may begin in response to an explicit user command to begin or an explicit user request for particular video information. Accordingly, the scope of various aspects of the present invention should not be limited by characteristics of any particular initiating events or conditions.

The exemplary method 100 may, at step 120, comprise receiving a current request from a user for current (or first) video information. Such a request may comprise any of a large variety of characteristics. For example and without limitation, such a request may comprise a selection of a video program from a menu, a request to view a program on a particular television channel, a request to view a program on a next, previous or last channel, a request to view a channel on a sequential list of channels (e.g., a list of favorite or genre channels), etc. Note that video information (e.g., a video program) may often, but not necessarily, include corresponding audio information.

Further for example, a user may communicate such a request in any of a large variety of ways. For example, a user may communicate such a request using various user interface devices. For example and without limitation, a user may communicate such a request using a television or video receiver remote control, using buttons on a television or video receiver, using a graphical user interface, etc.

In general, step 120 may comprise receiving a current request from a user for current video information. Accordingly, the scope of various aspects of the present invention should not be limited by characteristics of a particular type of request or way of receiving such a request.

The exemplary method 100, at step 130, may comprise receiving a first video stream and a second video stream simultaneously. For example, the first video stream may comprise the current (or first) video information corresponding to the user request received at step 120, and the second video stream may comprise second video information that was not requested by the user for current presentation.

As will be discussed in more detail later with respect to the exemplary method 200 illustrated in FIG. 2, the exemplary method 100 may comprise determining the second (or non-requested) video information in a variety of ways. For example and without limitation, the method 100 may comprise determining the second video information based, at least in part, on previously presented video information, a sequential list of video information, monitored user video request behavior, etc. The scope of various aspects of the present invention should not be limited by characteristics of a particular way of determining and/or identifying the second video information.

Receiving a video stream may, for example, comprise any of a variety of video receiving activities. For example and without limitation, receiving a video stream may comprise receiving a signal comprising the video stream through a tuner and associated receiver. In an exemplary television scenario, a plurality of video streams of a multi-stream QAM channel may be received through a tuner and associated QAM receiver. The exemplary tuner and QAM receiver may, for example, transform the received multi-stream QAM signal to digital video data corresponding to a plurality of video streams carried in the QAM signal. Video data streams corresponding to the currently requested first video information and the second video information may then be selected from the variety of video streams, and the data corresponding to the remaining streams may be discarded.

In an alternative exemplary television scenario, respective pluralities of video streams may be received by a plurality of tuners and associated QAM receivers. For example, a first tuner and QAM receiver may transform a first multi-stream QAM channel to digital data corresponding to a first plurality of video streams, and a second tuner and QAM receiver may transform a second multi-stream QAM channel to digital data corresponding to a second plurality of video streams. A first video data stream corresponding to the currently requested first video information may be selected from the first plurality of video streams, and a second video data stream corresponding to the second video information may be selected from the second plurality of video streams.

Note that the above television QAM examples are merely exemplary and should by no means limit the scope of various aspects of the present invention. In general, step 130 may comprise receiving a first video stream and a second video stream simultaneously, where the first video stream comprises the requested current (or first) video information, and the second video stream comprises the second video information that was not requested by the user for current presentation. Accordingly, the scope of various aspects of the present invention should not be limited by characteristics of the previously discussed exemplary scenarios or of particular video signal receiving methods or apparatus.

The exemplary method 100, at step 140, may comprise processing the received first video stream to present the first video information to the user at the current time. Such processing may, for example, comprise buffering first video stream data for decryption and/or decoding. Such processing may, for example, comprise performing error correction on the first video stream data. Such processing may also, for example, comprise communicating conditional access information. Such processing may further, for example, comprise tracking timing for components of the first video information. Such processing may additionally, for example, comprise parsing various protocol layers associated with the first video stream. Such processing may, for example, comprise decoding video data in the first video stream. Such processing may, for example, comprise generating a video display driver signal that, when applied to a video display, causes the video display to generate a corresponding human-perceivable video image.

In an exemplary television video scenario, step 140 may comprise processing the received first video stream by buffering video data associated with the first video stream, decoding the buffered video data, converting the decoded video data into a video display driver signal, and providing the video display driver signal to a video display device.

In general, step 140 may comprise processing the received first video stream to present the first video information to the user at the current time. Accordingly, the scope of various aspects of the present invention should not be limited by characteristics of particular video signal processing activities performed to present video information to a user.

The exemplary method 100, at step 150, may comprise pre-processing the received second video stream in preparation for presenting the second video information to the user in the future. Step 150 may, for example, reduce latency in presenting the second video information to the user, if and when the user requests the second video information, by performing pre-processing in preparation for presenting the second video information to the user. Step 150 may, for example, comprise performing various portions of the total processing (e.g., as performed at step 140 to present the first video information) performed to present the second video information to the user.

For example and without limitation, step 150 may comprise buffering second video stream data for decryption and/or decoding. Such buffering of video information corresponding to video information not presently being presented to a user may reduce latency caused by the time it takes to fill a buffer with new video information.

Such buffering may also, for example, comprise managing buffered data from the second video stream such that a next applicable access point and subsequent compressed data are generally available for decoding upon user request for the second video information. Managing the buffered data in such a way may reduce latency caused by waiting for an access point to arrive before beginning decoding activities. An access point may generally be considered to be a point in the video data stream at which decoding may effectively begin. For example and without limitation, such an access point may comprise a reference frame (or intra-coded frame) in various video encoding schemes.

Step 150 may, for example, comprise communicating conditional access information related to the second video stream with a source of the second video stream. For example, step 150 may comprise determining and/or establishing the rights of the user to receive the second video information prior to the user requesting the second video information. Such determination of user rights corresponding to the second video information may reduce latency in presenting the second video information to the user if and when the user requests the second video information.

Also, for example, step 150 may comprise preparing for, or even performing, decryption of encrypted video information. For example, step 150 may comprise exchanging public and private key information with a source of the second video stream. Step 150 may, for example, comprise decrypting encrypted second video information prior to the user requesting the second video information. Such establishment and/or performance of decryption activities corresponding to the second video information may reduce latency in presenting the second video information to the user if and when the user requests the second video information.

Further for example, step 150 may comprise performing error correction processing of received video data from the second video stream. By performing such error correction processing prior to the user requesting the second video information, latency resulting from performing error correction on an initial portion of the second video stream, if and when the user requests the second video information, may be reduced or eliminated.

Step 150 may, for example, comprise tracking timing for components of the second video information. For example and without limitation, step 150 may comprise tracking video display synchronization for the second video information relative to the video display synchronization of the first video information being presently provided to the user. Such timing tracking may, for example, be utilized to control buffering activities for the second video information to provide a smooth and rapid transition between presentation of the first video information and presentation of the second video information if and when the user requests the second video information.

Step 150 may, for example, comprise parsing various communication protocol layers associated with the second video stream. By performing such parsing activities prior to the user requesting the second video information, latency resulting from performing such parsing after the user requests the second video information may be reduced or eliminated.

Step 150 may, for example, comprise decoding video data in the second video stream prior to the user requesting the second video information. Such decoding of video data from the second video stream prior to the user requesting the second video information may reduce or eliminate latency associated with decoding an initial portion of the data from the second video stream after the user requests the second video information.

In an exemplary television video scenario, step 150 may comprise pre-processing the received second video stream by buffering video data associated with the second video stream and maintaining the buffer such that an access point and subsequent compressed data are generally available for decoding if and when the user requests the second video information.

In general, step 150 may comprise pre-processing the received second video stream in preparation for presenting the second video information to the user in the future. Accordingly, the scope of various aspects of the present invention should not be limited by characteristics of particular video signal pre-processing activities performed in preparation for presenting the second video information to a user if and when the user requests the second video information.

Note that the exemplary method 100 is not to be limited to receiving and pre-processing only one non-requested video stream. For example and without limitation, the method 100 may comprise receiving and pre-processing a third (or $n^{th}$) video stream simultaneously with the first and second video streams, where the third video stream comprises third video information not currently requested by the user. In an exemplary scenario, the second video stream may comprise information corresponding to an adjacent video channel lower than the current video channel, and the third video stream may comprise information corresponding to an adjacent video channel higher than the current video channel.

Figure 2:
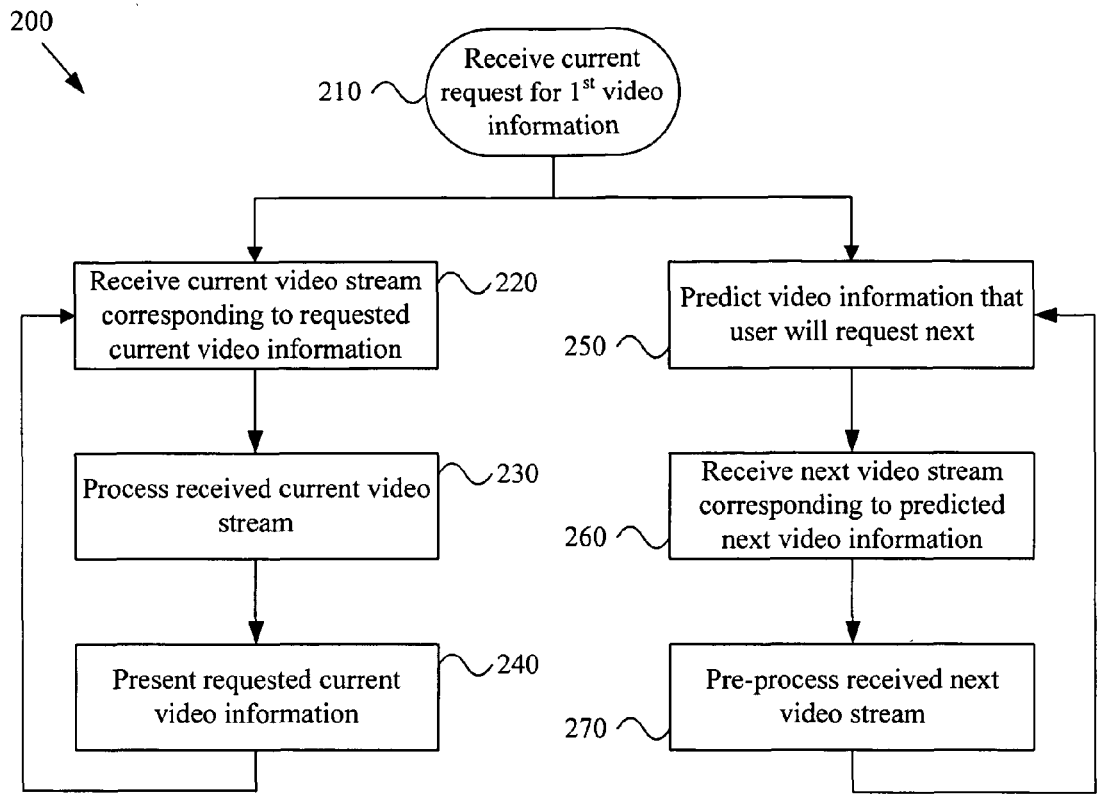
FIG. 2 is a flow diagram illustrating an exemplary method for providing reduced latency in a video signal processing system, in accordance with various aspects of the present invention.

FIG. 2 is a flow diagram illustrating an exemplary method 200 for providing reduced latency in a video signal processing system, in accordance with various aspects of the present invention. The exemplary method 200 may, for example and without limitation, share various characteristics with the exemplary method 100 illustrated in FIG. 1 and discussed previously.

The exemplary method 200 may begin at step 210, which receives a current request for current video information. Step 210 may, for example and without limitation, share various characteristics with the exemplary method 100 (e.g., steps 110 and 120) illustrated in FIG. 1 and discussed previously. In the exemplary method 200, step 210 may be initiated in response to a user communicating a current request for current (or first) video information. Such a request may comprise any of a large variety of characteristics. For example and without limitation, such a request may comprise information regarding a selection of a video program from a menu, a request to view a program on a particular television channel, a request to view a program on a next, previous or last channel, a request to view a channel on a sequential list of channels (e.g., a list of favorite or genre channels), etc.

Further for example, a user may communicate such a request in any of a large variety of ways. For example, a user may communicate such a request using various user interface devices. For example and without limitation, a user may communicate such a request using a television or video receiver remote control, using buttons on a television or a video receiver, using a graphical user interface, etc.

In general, step 210 may comprise receiving a current request for current video information. Accordingly, the scope of various aspects of the present invention should not be limited by characteristics of a particular type of request or way of receiving such a request.

The exemplary method 200, at step 220, may comprise receiving a current (or first) video stream. Step 220 may, for example and without limitation, share various characteristics with the exemplary method 100 (e.g., step 130) illustrated in FIG. 1 and discussed previously. The first video stream may, for example, comprise the current (or first) video information requested in the request received at step 210.

Receiving the first video stream may, for example, comprise any of a variety of video receiving activities. For example and without limitation, receiving the first video stream may comprise receiving a signal comprising the first video stream through a tuner and associated receiver. In an exemplary television scenario, a plurality of video streams of a multi-stream QAM channel may be received through a tuner and associated QAM receiver. The exemplary tuner and QAM receiver may, for example, transform the received multi-stream QAM signal to digital video data corresponding to a plurality of video streams carried in the QAM signal. The video data stream(s) corresponding to the currently requested first video information may then be selected from the plurality of video streams. Note that the above television QAM example is merely exemplary and should by no means limit the scope of various aspects of the present invention.

In general, step 220 may comprise receiving a first video stream comprising the current (or first) video information requested in the request received at step 210. Accordingly, the scope of various aspects of the present invention should not be limited by characteristics of the exemplary scenario or of particular video signal receiving methods or apparatus.

The exemplary method 200, at step 230, may comprise processing the received first video stream to present the first video information to the user at the current time. Step 230 may, for example, share various characteristics with step 140 of the exemplary method 100 illustrated in FIG. 1 and discussed previously.

Such processing may, for example, comprise buffering first video stream data for decryption and/or decoding. Such processing may, for example, comprise performing error correction on the video stream data. Such processing may also, for example, comprise communicating conditional access information. Such processing may further, for example, comprise tracking timing for components of the first video information. Such processing may, for example, comprise parsing various protocol layers associated with the first video stream. Such processing may additionally, for example, comprise decoding video data in the first video stream. Such processing may, for example, comprise generating a video display driver signal that, when applied to a video display, causes the video display to generate a corresponding human-perceivable video image.

In an exemplary television video scenario, step 230 may comprise processing the received first video stream by buffering video data associated with the first video stream, decoding the buffered video data, converting the decoded video data into a video display driver signal, and providing the video display driver signal to a video display device.

In general, step 230 may comprise processing the received first video stream to present the first video information to the user at the current time. Accordingly, the scope of various aspects of the present invention should not be limited by characteristics of particular video signal processing activities performed to present video information to a user.

The exemplary method 200, at step 240, may comprise presenting the requested current (or first) video information to a user. For example and without limitation, step 240 may comprise driving a video display device to generate human-perceivable video signals corresponding to the currently requested video information. Such a video display device may, for example, comprise an independent display device or a display device integrated into a television set. Such a video display device may comprise a fixed or portable display device. In general, step 240 may comprise presenting the requested current (or first) video information to a user. Accordingly, the scope of various aspects of the present invention should not be limited by characteristics of particular display devices or human-perceivable video signals.

The execution of exemplary method 200 may flow simultaneously to steps 220 and 250. Steps 220-240 may generally receive, process and present the currently requested video information, while steps 250-270 may generally receive and pre-process non-requested video information for efficient future presentation. In an exemplary scenario, steps 220-240 may be performed simultaneously with steps 250-270. Note, however, that such parallel operation is not required.

The exemplary method 200, at step 250, may comprise determining (or identifying) the next (or second) video information and corresponding video stream(s) that a user may request after the current video information. Such a determination may comprise characteristics of any of a large number of prediction methods or algorithms. For example and without limitation, step 250 may comprise determining the next video stream based on previously presented video information (e.g., previous channel). Also for example, step 250 may comprise determining the next video stream based on a sequential list of video information (e.g., a channel sequence or favorites list). Further for example, step 250 may comprise determining the next video stream based on monitored user behavior (e.g., channel(s) most often viewed, whether the user is channel surfing up or down, whether the user is hopping between sports channels or movie channels, etc.).

In an exemplary scenario, step 250 may comprise predicting a plurality of potential next video information streams, for subsequent receiving and pre-processing. In general, step 250 may comprise predicting the next video information and/or associated video stream(s) that a user may request next. Accordingly, the scope of various aspects of the present invention should not be limited by characteristics of a particular technique for making such a prediction.

The exemplary method 200, at step 260, may comprise receiving the next (or second) video stream corresponding to predicted next video information that the user may request next (e.g., as predicted at step 250). Step 260 may, for example and without limitation, share various characteristics with step 130 of the method 100 illustrated in FIG. 1 and discussed previously.

Receiving the second video stream may, for example, comprise any of a variety of video receiving activities (e.g., as discussed previously regarding receiving the first video stream at step 220). For example and without limitation, receiving the video stream may comprise receiving a signal comprising the second video stream through a tuner and associated receiver. Such a tuner and associated receiver may, for example, be the same as those used to receive the first video stream at step 220, or may be different.

In an exemplary non-limiting television scenario, a plurality of video streams of a multi-stream QAM channel may be received through a tuner and associated QAM receiver. The exemplary tuner and QAM receiver may, for example, transform the received multi-stream QAM signal to digital video data corresponding to a plurality of video streams carried in the QAM signal. A video data stream corresponding to the second video information may then be selected from the variety of video data streams, and the data corresponding to the remaining streams discarded. Note, however, that video data streams corresponding to the first video information and the second video information may both be received through the same tuner and QAM receiver when the video data streams are part of the same QAM signal.

In an alternative exemplary non-limiting television scenario, respective pluralities of video streams may be received by a pair of tuners and corresponding QAM receivers. For example, a first tuner and QAM receiver may transform a first multi-stream QAM channel to digital video data corresponding to a first plurality of video streams, and a second tuner and QAM receiver may transform a second multi-stream QAM channel to digital video data corresponding to a second plurality of video streams. A first video data stream corresponding to the currently requested first video information may be selected from the first plurality of video streams, and a second video data stream corresponding to the second video information may be selected from the second plurality of video streams.

Note that the previous television QAM examples are merely exemplary and should by no means limit the scope of various aspects of the present invention. In general, step 260 may comprise receiving the next (or second) video stream simultaneously with the current (or first) video stream, where the first video stream comprises the requested current (or first) video information, and the second video stream comprises the next (or second) video information that was not requested by the user for current presentation. Accordingly, the scope of various aspects of the present invention should not be limited by characteristics of the exemplary scenarios or of particular video signal receiving methods or apparatus.

The exemplary method 200, at step 270, may comprise pre-processing the received second video stream in preparation for presenting the second video information to the user in the future. Step 270 may, for example and without limitation, share various aspects with step 150 of the exemplary method 100 illustrated in FIG. 1 and discussed previously.

As explained previously, execution of the exemplary method 200 may loop through steps 250-270 to form an execution loop in which next video information is predicted, received, and processed in preparation for presentation if and when a request for the predicted next video information is received.

Note that the exemplary method 200 is not to be limited to receiving and pre-processing only one non-requested video stream. For example and without limitation, the method 200 may comprise receiving and pre-processing a third (or $n^{th}$) video stream simultaneously with the first and second video streams, where the third video stream comprises third video information not currently requested by the user.

Figure 3:
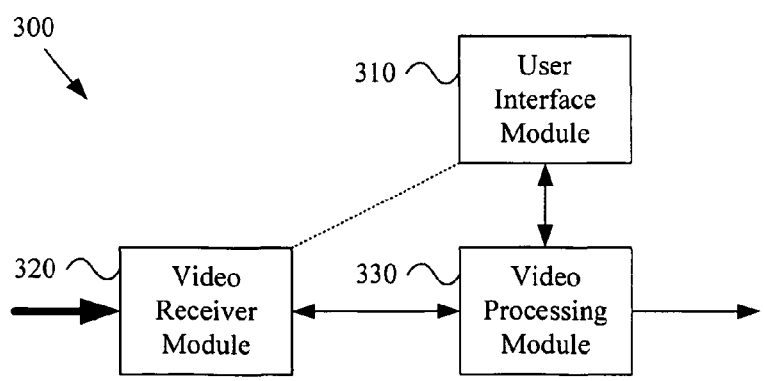
FIG. 3 is a diagram showing an exemplary system that provides reduced latency in a video signal processing system, in accordance with various aspects of the present invention.

FIG. 3 is a diagram showing an exemplary system 300 that provides reduced latency in a video signal processing system, in accordance with various aspects of the present invention. Various components and/or modules of the exemplary system 300 may, for example and without limitation, perform various functions of the exemplary methods 100, 200 illustrated in FIGS. 1-2 and discussed previously.

The exemplary system 300 may comprise a user interface module 310 that receives a current request from a user for current (or first) video information. The user interface module 310 may, for example and without limitation, perform various aspects of the exemplary methods 100, 200 (e.g., steps 120 and 210) illustrated in FIGS. 1-2 and discussed previously.

For example, the user interface module 310 may receive a current request for current (or first) video information. Such a request may comprise any of a large variety of characteristics. For example and without limitation, such a request may comprise a selection of a video program from a menu, a request to view a program on a particular television channel, a request to view a program on a next, previous or last channel, a request to view a channel on a sequential list of channels (e.g., a list of favorite or genre channels), etc.

Further for example, a user may communicate such a request with the user interface module 310 in any of a large variety of ways. For example and without limitation, the user interface module 310 may communicate with a user using a television or video receiver remote control. The user interface module 310 may, for example, communicate with a user using buttons on a television or video receiver. The user interface module 310 may, for example, communicate with a user using a graphical user interface (e.g., a program menu).

In general, the user interface module 310 may receive a current request for first (or current) video information. Accordingly, the scope of various aspects of the present invention should not be limited by characteristics of a particular way or apparatus for receiving such a request.

The exemplary system 300 may comprise a video receiver module 320 that simultaneously receives a first video stream and a second video stream, wherein the first video stream comprises the requested current (or first) video information, and the second video stream comprises second video information that is not currently requested by the user. The video receiver module 320 may, for example and without limitation, perform various functions of the exemplary methods 100, 200 (e.g., steps 130, 220 and 260) illustrated in FIGS. 1-2 and discussed previously.

For example, the video receiver module 320 may simultaneously receive a current (or first) video stream and a next (or second) video stream. The video receiver module 320 may receive the first video stream and second video stream by performing any of a variety of video receiving activities. For example and without limitation, the video receiver module 320 may receive the first video stream and second video stream by receiving one or more signals comprising the first video stream and the second video stream through one or more tuners and associated receivers.

As will be discussed in more detail later, the identity of the second video stream may be determined by the video processing module 330 (or associated module), which is communicatively coupled to the video receiver module 320.

In an exemplary television scenario, the video receiver module 320 may receive a plurality of video streams of a multi-stream QAM channel through a tuner and associated QAM receiver. The exemplary tuner and QAM receiver may, for example, transform the received multi-stream QAM signal to digital video data corresponding to a plurality of video streams carried in the QAM signal. The video data stream(s) corresponding to the currently requested first video information and the second video information may then be selected from the variety of video streams, and the remaining data may be discarded.

In an alternative exemplary non-limiting television scenario, respective pluralities of video streams may be received by a plurality of tuners and associated QAM receivers. For example, a first tuner and QAM receiver may transform a first multi-stream QAM channel to digital video data corresponding to a first plurality of video streams, and a second tuner and QAM receiver may transform a second multi-stream QAM channel to digital video data corresponding to a second plurality of video streams. A first video data stream corresponding to the currently requested first video information may be selected from the first plurality of video streams, and a second video data stream corresponding to the second video information may be selected from the second plurality of video streams.

Note that the previous television QAM examples are merely exemplary and should by no means limit the scope of various aspects of the present invention. In general, the exemplary video receiver module 320 may simultaneously receive a first video stream and a second video stream, wherein the first video stream comprises the requested current (or first) video information, and the second video stream comprises second video information that is not currently requested by the user. Accordingly, the scope of various aspects of the present invention should not be limited by characteristics of a particular received signal or a particular receiver module apparatus or configuration.

The exemplary system 300 may comprise a video processing module 330 that processes the first video stream to present the first video information to the user at the current time, and pre-processes the second video stream in preparation for presenting the second video information to the user at a future time. The video processing module 330 may, for example and without limitation, perform various functions of the exemplary methods 100, 200 (e.g., steps 140, 150, 230, 250 and 270) illustrated in FIGS. 1-2 and discussed previously.

For example, the video processing module 330 may process the received first video stream to present the first video information to the user at the current time. In performing such processing, the video processing module 330 may, for example, buffer first video stream data for decryption and/or decoding. Also, the video processing module 330 may, for example, perform error correction processing. Additionally, for example, the video processing module 330 may communicate (e.g., receive and/or transmit) conditional access information with a source of the first video stream. Also, the video processing module 330 may, for example, track timing (e.g., timestamps or synchronization) for components of the first video information. Further, the video processing module 330 may parse various protocol layers associated with the first video stream. The video processing module 330 may, for example, decode video data in the first video stream. In addition, the video processing module 330 may generate a video display driver signal (e.g., independently or in conjunction with a video display driver module) that, when applied to a video display, causes the video display to generate a corresponding human-perceivable video image.

In an exemplary television video scenario, the video processing module 330 may process the received first video stream by buffering video data associated with the first video stream, decoding the buffered video data, converting the decoded video data into a video display driver signal (e.g., independently or in conjunction with a video display driver module), and providing the video display driver signal to a video display device.

The video processing module 330 may pre-process the received second video stream in preparation for presenting the second video information to the user in the future. The video processing module 330 may, for example, reduce latency in presenting the second video information to the user if and when the user requests the second video information by performing pre-processing in preparation for presenting the second video information to the user. The video processing module 330 may, for example, perform various portions of the total processing required to present the second video information to the user.

The video processing module 330 (or a sub-module thereof) may determine or identify the second video stream. For example, the video processing module 330 may determine (or identify) the next (or second) video information and corresponding video stream(s) that a user may request after the current video information. Such a determination may, for example and without limitation, comprise characteristics of any of a large number of prediction methods or algorithms. For example and without limitation, the video processing module 330 may determine the next video stream based on previously presented video information (e.g., previous channel). Also for example, the video processing module 330 may determine the next video stream based on a sequential list of video information (e.g., a channel sequence or favorites list). Further for example, the video processing module 330 may determine the next video stream based on monitored user behavior (e.g., channel(s) most often viewed, whether the user is channel surfing up or down, whether the user is hopping between sports channels or movie channels, etc.).

In an exemplary scenario, the video processing module 330 may determine a plurality of potential next video information streams for subsequent receiving and pre-processing. In general, the video processing module 330 may determine the next video information and/or associated video stream(s) that a user may request next. Accordingly, the scope of various aspects of the present invention should not be limited by characteristics of a particular technique or apparatus for making such a determination or prediction.

The video processing module 330 may, for example and without limitation, buffer second video stream data for decryption and/or decoding. Such buffering of video information corresponding to video information not presently being presented to a user may reduce latency caused by the time it takes to fill a buffer with new video information.

Such buffering may also, for example, comprise managing buffered data from the second video stream such that a next applicable access point and subsequent compressed data are generally available for decoding upon user request for the second video information. Managing the buffered data in such a way may reduce latency caused by waiting for an access point to arrive before beginning decoding activities. Such an access point in the second video stream may, for example and without limitation, comprise a reference frame (or intra-coded frame) in various video encoding schemes.

Such management of buffered data may comprise managing the buffered data in any of a variety of manners. For example, in a non-limiting exemplary scenario, data preceding a particular entry point may be discarded while data succeeding the particular entry point is buffered (or vice versa). In another non-limiting exemplary scenario, data corresponding to a particular set of entry points (e.g., next and last entry points) may be buffered while data corresponding to other entry points is discarded. In a further non-limiting exemplary scenario, old data may be discarded from a first end of a buffer as new data arrives at a second end of the buffer. Accordingly, the scope of various aspects of the present invention should not be limited by any particular manner of managing buffered data.

The video processing module 330 may, for example, communicate conditional access information related to the second video stream data. For example, the video processing module 330 may determine the rights of the user to receive the second video information prior to the user requesting the second video information. Such determination of user rights corresponding to the second video information may reduce latency in presenting the second video information to the user if and when the user requests the second video information. For example and without limitation, such determination of user rights may enable the buffering of data, as described above.

Also, for example, the video processing module 330 may prepare for, or even perform, decryption of encrypted video information. For example, the video processing module 330 may exchange public or private key information with an information provider. The video processing module 330 may, for example, decrypt encrypted second video information prior to the user requesting the second video information. Such establishment and/or performance of decryption activities corresponding to the second video information may reduce latency in presenting the second video information to the user if and when the user requests the second video information. For example and without limitation, such performance of decryption activities may enable the buffering of data, as described above.

Further for example, the video processing module 330 may perform error correction processing of received video data from the second video stream. By performing such error correction activities prior to the user requesting the second video information, latency resulting from performing error correction on an initial portion of data from the second video stream may be reduced or eliminated. For example and without limitation, such performance of error correction activities may enable the buffering of data, as described above.

The video processing module 330 may, for example, track timing (e.g., timestamp or synchronization) for components of the second video information. For example and without limitation, the video processing module 330 may track video display synchronization for the second video information relative to the video display synchronization of the first video information being currently presented. Such timing tracking may, for example, be utilized to control buffering activities for the second video information to provide a smooth transition between presentation of the first video information and presentation of the second video information if and when the user requests the second video information.

The video processing module 330 may comprise managing timing information in any of a variety of manners. For example and without limitation the video processing module 330 may maintain a time base of the second video information using time stamps associated with the second video information. The video processing module 330 may also, for example, maintain one or more time delay values representing the presentation delay of received video information stored in a buffer. Accordingly, the scope of various aspects of the present invention should not be limited by any particular manner of managing timing information.

The video processing module 330 may, for example, parse various protocol layers associated with the second video stream. By performing such parsing activities prior to the user requesting the second video information, latency resulting from performing such parsing after the user requests the second video information may be reduced or eliminated. Note that in various non-limiting exemplary scenarios, such parsing operations may facilitate buffering of the received video data.

The video processing module 330 may, for example, decode video data in the second video stream prior to the user requesting the second video information. Such video data decoding of video data from the second video stream prior to the user requesting the second video information may reduce or eliminate latency associated with decoding an initial portion of the data from the second video stream after the user requests the second video information.

In an exemplary television video scenario, the video processing module 330 may pre-process the received second video stream by buffering at least a portion of video data associated with the second video stream and maintaining the buffer such that an access point and subsequent compressed data are generally available for decoding if and when the user requests the second video information.

In general, the video processing module 330 may pre-process the received second video stream in preparation for presenting the second video information to the user in the future. Accordingly, the scope of various aspects of the present invention should not be limited by characteristics of particular video signal pre-processing apparatus or activities performed in preparation for presenting the second video information to a user if and when the user requests the second video information.

The video processing module 330 may, for example, output a signal corresponding to the processed first video information to subsequent modules. For example and without limitation, the video processing module 330 may provide such a signal to a video driver module and/or a video display device. The scope of various aspects of the present invention should not be limited by particular subsequent modules or apparatus.

Figure 4:
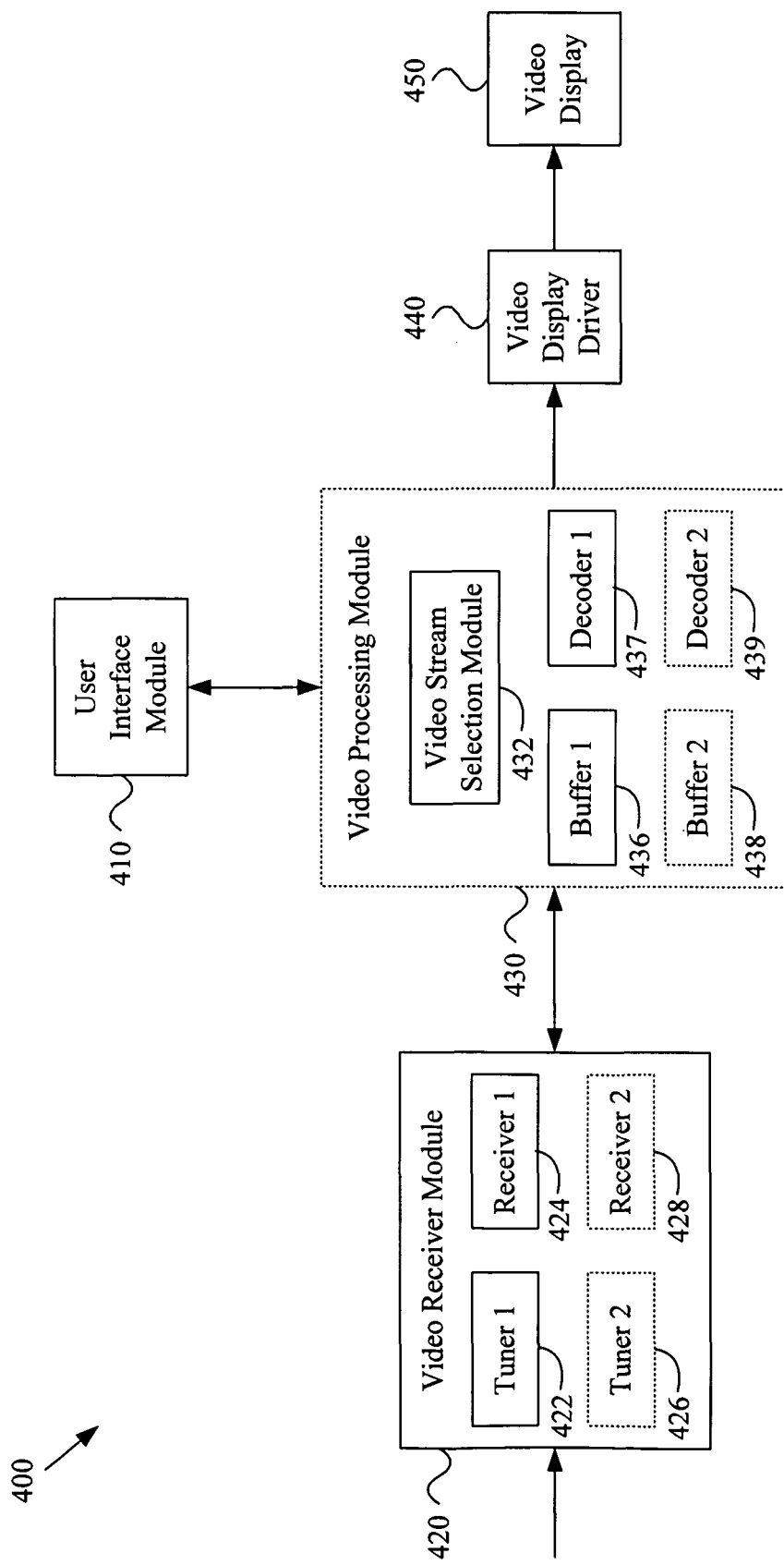
FIG. 4 is a diagram showing an exemplary system that provides reduced latency in a video signal processing system, in accordance with various aspects of the present invention.

FIG. 4 is a diagram showing an exemplary system 400 that provides reduced latency in a video signal processing system, in accordance with various aspects of the present invention. The exemplary system 400 may, for example and without limitation, share various characteristics with the exemplary system 300 illustrated in FIG. 3 and discussed previously.

For example, the exemplary system 400 may comprise a user interface module 410 that receives a current request from a user for current (or first) video information. The user interface module 410 may, for example and without limitation, share various characteristics with the user interface module 310 of the exemplary system 300 illustrated in FIG. 3 and discussed previously. The exemplary system 400 may, for example, comprise a television system utilizing QAM channels for communicating streams of video information. However, the scope of various aspects of the present invention should by no means be limited by characteristics of such an exemplary television system.

For example, the user interface module 410 may receive a current request for current (or first) video information. Such a request may comprise any of a large variety of characteristics. For example and without limitation, such a request may comprise a selection of a video program from a menu, a request to view a program on a particular television channel, a request to view a program on a next, previous or last channel, or a request to view a channel on a sequential list of channels (e.g., a list of favorite or genre channels).

Further for example, a user may communicate such a request with the user interface module 410 in any of a large variety of ways. For example and without limitation, the user interface module 410 may communicate with a user using a television or video receiver remote control. The user interface module 410 may, for example, communicate with a user using buttons on a television or a video receiver. Also, for example, the user interface module 410 may communicate with a user using a graphical user interface (e.g., a program menu).

In general, the user interface module 410 may receive a current request for current (or first) video information. Accordingly, the scope of various aspects of the present invention should not be limited by characteristics of a particular way or apparatus for receiving such a request.

The exemplary system 400 may comprise a video receiver module 420 that simultaneously receives a first video stream and a second video stream, wherein the first video stream comprises the requested current (or first) video information, and the second video stream comprises second video information that is not currently requested by the user. The video receiver module 420 may, for example and without limitation, share various characteristics with the video receiver module 320 of the exemplary system 300 illustrated in FIG. 3 and discussed previously.

The video receiver module 420 may, for example and without limitation, receive the first video stream and second video stream by performing any of a variety of video receiving activities. For example and without limitation, the video receiver module 420 may receive the first video stream and second video stream by receiving one or more signals comprising the first video stream and the second video stream through one or more tuners and associated receivers.

In an exemplary television scenario, the video receiver module 420 may comprise a first tuner 422 and associated first receiver 424 (e.g., a QAM receiver). The video receiver module 420 may receive a plurality of video streams of a multi-stream channel (e.g., a QAM channel) through the first tuner 422 and first receiver 424. The exemplary first tuner 422 and first receiver 424 may, for example, transform the received multi-stream signal to digital video data corresponding to a plurality of video streams carried in the multi-stream signal. The video data stream(s) corresponding to the currently requested first video information and the second video information may then be selected from the variety of video streams, and the remaining data may be discarded.

In an alternative exemplary non-limiting television scenario, the video receiver module 420 may also comprise a second tuner 426 and associated second receiver 428 (e.g., a second QAM receiver). The video receiver module 420 may receive respective pluralities of video streams by the plurality of tuners 422, 426 and associated receivers 424, 428. For example, the first tuner 422 and first receiver 424 may transform a first multi-stream channel to digital data corresponding to a first plurality of video streams, and the second tuner 426 and second receiver 428 may transform a second multi-stream channel to digital data corresponding to a second plurality of video streams. A first video data stream corresponding to the currently requested first video information may be selected from the first plurality of video streams, and a second video data stream corresponding to the second video information may be selected from the second plurality of video streams.

Note that the previous television examples are merely exemplary and should by no means limit the scope of various aspects of the present invention. In general, the exemplary video receiver module 420 may simultaneously receive a first video stream and a second video stream, wherein the first video stream comprises the requested current (or first) video information, and the second video stream comprises second video information that is not currently requested by the user. Accordingly, the scope of various aspects of the present invention should not be limited by characteristics of a particular received signal or a particular receiver module apparatus or configuration.

The exemplary system 400 may comprise a video processing module 430 that processes the first video stream to present the first video information to the user at the current time, and pre-processes the second video stream in preparation for presenting the second video information to the user in the future. The video processing module 430 may, for example and without limitation, share various characteristics with the video processing module 330 of the exemplary system 300 illustrated in FIG. 3 and discussed previously.

The video processing module 430 may, for example, comprise a video stream selection module 432 that determines the second video stream to be pre-processed. For example, the video stream selection module 432 may determine (or identify) the next (or second) video information and corresponding video stream(s) that a user may request after the current video information. Such a determination may, for example, comprise characteristics of any of a large number of prediction methods or algorithms. For example and without limitation, the video stream selection module 432 may determine the next video stream based on previously presented video information (e.g., previous channel). Also for example, the video stream selection module 432 may determine the next video stream based on a sequential list of video information (e.g., a channel sequence or favorites list). Further for example, the video stream selection module 432 may determine the next video stream based on monitored user behavior (e.g., channel(s) most often viewed, whether the user is channel surfing up or down, whether the user is hopping between sports channels or movie channels, etc.).

In an exemplary scenario, the video stream selection module 432 may determine a plurality of potential next video information streams for subsequent receiving and pre-processing. In general, the video stream selection module 432 may determine the next video information and/or associated video stream(s) that a user may request. Accordingly, the scope of various aspects of the present invention should not be limited by characteristics of a particular technique or apparatus for making such a determination or prediction.

The video processing module 430 may, for example, process the received first video stream to present the first video information to the user at the current time. In performing such processing, the video processing module 430 may, for example, buffer first video stream data for decryption and/or decoding. The video processing module 430 may, for example, comprise a first buffer 436 to utilize for such buffering.

The video processing module 430 may, for example, perform error correction processing. The video processing module 430 may, for example, communicate conditional access information with a source of the first video stream. Also, the video processing module 430 may track timing (e.g., timestamps or synchronization) for components of the first video stream. Further, the video processing module 430 may parse various communication protocol layers associated with the first video stream.

The video processing module 430 may, for example, decode video data in the first video stream. The video processing module 430 may, for example, comprise a first decoder 437 to perform such decoding.

The exemplary system 400 may, for example, comprise a video display driver 440 and a video display 450. The video processing module 430 may, for example, provide a signal indicative of the first video information to the video display driver 440. The video display driver 440 may, for example, generate a video display driver signal that, when applied to the video display 450, causes the video display 450 to generate a corresponding human-perceivable video image.

In an exemplary television video scenario, the video processing module 430 may process the received first video stream by buffering video data associated with the first video stream in the first buffer 436, decoding the buffered video data with the first decoder 437, and providing a signal indicative of the first video information to the video display driver 440, which converts the signal from the video processing module 430 into a video display driver signal and provides the video display driver signal to the video display 450.

The video processing module 430 may pre-process the received second video stream in preparation for presenting the second video information to the user in the future. The video processing module 430 may, for example, reduce latency in presenting the second video information to the user if and when the user requests the second video information by performing pre-processing in preparation for presenting the second video information to the user. The video processing module 430 may, for example, perform such pre-processing by performing various portions of the total processing required to present the second video information to the user.

For example and without limitation, the video processing module 430 may buffer second video stream data for decryption and/or decoding. For example, the video processing module 430 may buffer second video stream data in a second buffer 438 or in a portion of the first buffer 436. Such buffering of video information corresponding to video information not presently being presented to a user may reduce latency caused by the time it takes to fill a buffer with newly received video information.

Such buffering may also, for example, comprise managing buffered data from the second video stream such that a next applicable access point and subsequent compressed data are generally available for decoding upon user request for the second video information. Managing the buffered data in such a way may reduce latency caused by waiting for an access point to arrive before beginning decoding activities. As explained previously, such an access point in the second video stream may, for example and without limitation, comprise a reference frame (or intra-coded frame) in various video encoding schemes.

The video processing module 430 may, for example, communicate (e.g., transmit and/or receive) conditional access information related to the second video stream with a source of the second video stream. For example, the video processing module 430 may determine the rights of the user to receive the second video information prior to the user requesting the second video information. Such determination of user rights corresponding to the second video information may reduce latency in presenting the second video information to the user if and when the user requests the second video information.

Also, for example, the video processing module 430 may prepare for, or even perform, decryption of encrypted video information. For example, the video processing module 430 may exchange public or private key information with an information provider. The video processing module 430 may, for example, decrypt encrypted second video information prior to the user requesting the second video information. Such establishment and/or performance of decryption activities corresponding to the second video information may reduce latency in presenting the second video information to the user if and when the user requests the second video information.

Further for example, the video processing module 430 may perform error correction processing of received video data from the second video stream. By performing such error correction activities prior to the user requesting the second video information, latency resulting from performing error correction on an initial portion of data from the second video stream may be reduced or eliminated.

The video processing module 430 may, for example, track timing (e.g., timestamps or synchronization) for components of the second video stream. For example and without limitation, the video processing module 430 may track video display synchronization for the second video information relative to the video display synchronization of the first video information being currently presented. Such timing tracking may, for example, be utilized to control buffering activities for the second video information to provide a smooth transition between presentation of the first video information and presentation of the second video information if and when the user requests the second video information.

The video processing module 430 may, for example, parse various communication protocol layers associated with the second video stream. By performing such parsing activities prior to the user requesting the second video information, latency resulting from performing such parsing after the user requests the second video information may be reduced or eliminated.

The video processing module 430 may, for example, decode video data in the second video stream prior to the user requesting the second video information. The video processing module 430 may, for example, comprise a second decoder 439 to perform such decoding or may, for example, utilize the first decoder 437 to perform such decoding in addition to decoding video data from the first video stream. Such decoding of video data from the second video stream prior to the user requesting the second video information may reduce or eliminate latency associated with decoding an initial portion of the data from the second video stream after the user requests the second video information.

In an exemplary television video scenario, the video processing module 430 may pre-process the received second video stream by buffering at least a portion of video data associated with the second video stream (e.g., in the second buffer 438 or a section of the first buffer 436) and maintaining the buffer such that an access point and subsequent compressed data is generally available for decoding if and when the user requests the second video information.

In general, the video processing module 430 may pre-process the received second video stream in preparation for presenting the second video information to the user in the future. Accordingly, the scope of various aspects of the present invention should not be limited by characteristics of particular video signal pre-processing apparatus or pre-processing activities performed in preparation for presenting the second video information to a user if and when the user requests the second video information.

The previous discussion described various exemplary system modules and sub-modules. The various modules and sub-modules may be implemented using hardware, software, or a combination thereof. For example and without limitation, any of the various modules and sub-modules may be independent circuits or may be integrated into a single integrated circuit. Accordingly, the scope of various aspects of the present invention should not be limited to characteristics of a particular hardware or software implementation.

In summary, various aspects of the present invention provide a system and method that provide reduced latency in a video signal processing system. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method, comprising:
   receiving a request for first video information;
   predicting a request for second video information;
   receiving a first video stream and a second video stream, the first video stream corresponding to the request for the first video information and the second video stream corresponding to the request for the second video information;
   decoding the first video stream; and
   while decoding the first video stream, pre-processing the second video stream, the pre-processing comprising:
      establishing user rights to receive the second video stream after predicting the request for the second video information and before receiving the request for the second video information;
      in response to the establishing the user rights to receive the second video stream, buffering at least a portion of the second video stream starting from an access point in the second video stream to cause the portion of the second video stream starting from the access point to be available for decoding upon receiving the request for the second video information; and
      tracking timing components of the second video stream relative to timing components of the first video stream, the timing components of the second video stream comprising timestamp or synchronization components, wherein the tracking the timing components of the second video stream is utilized to control buffering activities for the second video information.

2. The method of claim 1, wherein the pre-processing of the second video stream further comprises:
   receiving conditional access information for the second video stream after predicting the request for the second video information and before receiving the request for the second video information; and
   decrypting at least a portion of the second video stream using the conditional access information before receiving the request for the second video information.

3. The method of claim 2, wherein the receiving of the conditional access information further comprises:
   after predicting the request for the second video information and before receiving the request for the second video information, receiving key information for the second video stream; and
   decrypting the second video stream using the key information.

4. The method of claim 1, wherein the pre-processing of the second video stream further comprises:
   processing error correction of the second video stream before receiving the request for the second video information; and
   parsing communication protocol layers associated with the second video stream before receiving the request for the second video information.

5. The method of claim 1, further comprises:
   receiving the request for the second video information; and
   decoding the second video stream starting from the access point in the buffer in response to receiving the request for the second video information.

6. The method of claim 1, wherein the access point in the second video stream comprises a reference frame.

7. A system, comprising:
   an interface configured to receive a request for first video information;
   a video receiver configured to receive a first video stream and a second video stream, the first video stream corresponding to the request for the first video information and the second video stream corresponding to a request for second video information; and
   a video processor configured to:
      predict the request for the second video information;
      decode the first video stream;
      establish user rights to receive the second video stream after predicting the request for the second video information and before receiving the request for the second video information;
      in response to the establishing the user rights to receive the second video stream, buffer at least a portion of the second video stream starting from an access point in the second video stream to cause the portion of the second video stream starting from the access point to be available for decoding upon receiving the request for the second video information; and
      track timing components of the second video stream relative to timing components of the first video stream, the timing components of the second video stream comprising timestamp or synchronization components, wherein the tracking the timing components of the second video stream is utilized to control buffering activities for the second video information.

8. The system of claim 7, wherein the video processor is further configured to receive conditional access information for the second video stream after predicting the request for the second video information and before receiving the request for the second video information, and to decrypt at least a portion of the second video stream using the conditional access information.

9. The system of claim 8, wherein the video processor is further configured to, after predicting the request for the second video information and before receiving the request for the second video information, receive key information for the second video stream and decrypt the second video stream using the key information.

10. The system of claim 7, wherein the video processor is further configured to:
    process error correction of the second video stream before receiving the request for the second video information; and parse communication protocol layers associated with the second video stream before receiving the request for the second video information.

11. The system of claim 7, wherein the video receiver is further configured to receive the first video stream through a first tuner and to receive the second video stream through a second tuner.

12. The system of claim 7, wherein the access point in the second video stream comprises a reference frame.

13. The system of claim 7, wherein:
the interface is further configured to receive the request for the second video information; and
the video processor is further configured to decode the second video stream starting from the access point in the buffer in response to receiving the request for the second video information.

14. An apparatus, comprising:
circuits configured to:
receive a request for first video information;
predict a request for second video information;
receive a first video stream and a second video stream, the first video stream corresponding to the request for the first video information and the second video stream corresponding to the request for the second video information;
decode the first video stream; and
while decoding the first video stream, pre-process the second video stream, the pre-processing of the second video stream comprising the one or more circuits configured to:
establishing user rights to receive the second video stream after predicting the request for the second video information and before receiving the request for the second video information;
in response to the establishing the user rights to receive the second video stream, buffer at least a portion of the second video stream starting from an access point in the second video stream to cause the portion of the second video stream starting from the access point to be available for decoding upon receiving the request for the second video information;
track timing components of the second video stream relative to timing components of the first video stream, the timing components of the second video stream comprising timestamp or synchronization components, wherein the tracking the timing components of the second video stream is utilized to control buffering activities for the second video information;
receive the request for the second video information; and
decode the second video stream starting from the access point in the buffer in response to receiving the request for the second video information.

15. The apparatus of claim 14, wherein the pre-processing of the second video stream further comprises the one or more circuits configured to:
receive conditional access information for the second video stream after predicting the request for the second video information and before receiving the request for the second video information; and
decrypt at least a portion of the second video stream using the conditional access information before receiving the request for the second video information.

16. The apparatus of claim 15, wherein the receiving of the conditional access information further comprises the one or more circuits configured to:
after predicting the request for the second video information and before receiving the request for the second video information, receive key information for the second video stream; and
decrypt the second video stream using the key information.

* * * * *

UNITED STATES PATENT AND TRADEMARK OFFICE
CERTIFICATE OF CORRECTION

Page 1 of 1

| | |
|---|---|
| PATENT NO. | : 9,438,951 B2 |
| APPLICATION NO. | : 14/492928 |
| DATED | : September 6, 2016 |
| INVENTOR(S) | : Alexander G. MacInnis |

It is certified that error appears in the above-identified patent and that said Letters Patent is hereby corrected as shown below:

In the Claims

In Column 21, Claim 14, Line 17, delete "circuits configured to:" and insert --one or more circuits configured to:--.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*